April 14, 1959 J. M. PARKYN 2,882,499

AMPLITUDE MODULATOR ARRANGEMENTS FOR HIGH FREQUENCY ENERGY

Filed March 4, 1957

INVENTOR
John Michael Parkyn
BY
Baldwin & Wight
his ATTORNEYS

United States Patent Office 2,882,499

Patented Apr. 14, 1959

2,882,499

AMPLITUDE MODULATOR ARRANGEMENTS FOR HIGH FREQUENCY ENERGY

John M. Parkyn, St. Albans, England, assignor to Marconi Instruments Limited, London, England, a British company Application March 4, 1957, Serial No. 643,605

Claims priority, application Great Britain April 16, 1956

3 Claims. (Cl. 332—52)

Figure 1:
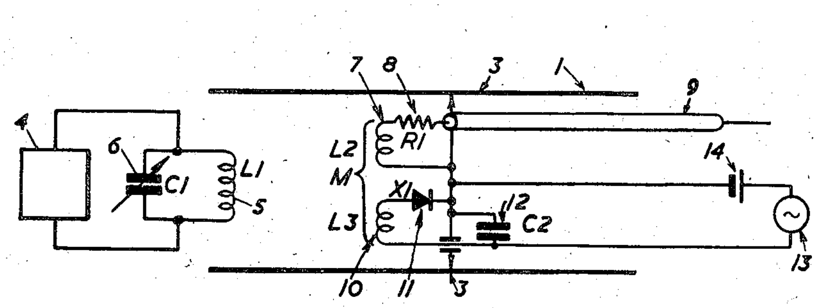

This invention relates to amplitude modulator arrangements for high frequency energy. Although not limited to its application thereto the invention is primarily intended for and is very advantageous for use in amplitude modulated signal generators for test and measurement purposes. The invention may however be used in other cases where amplitude modulation is required.

The simplest method of effecting amplitude modulation of high frequency energy is directly to modulate a high frequency oscillator and, because of its simplicity, the method has been fairly widely used in amplitude modulated signal generators. It has, however, the disadvantage that frequency modulation almost invariably accompanies the amplitude modulation and this is very objectionable in many cases. It is of course possible to overcome this defect by providing one or more amplifying stages fed from an unmodulated oscillator and effecting amplitude modulation at an amplifying stage, but this involves considerable increase in cost and complexity, not only because additional stages have to be provided, but because those stages usually require to be tuned. Again a single amplifying stage following the unmodulated oscillator is usually not enough, for, in general, such a single stage, if subjected to amplitude modulation, will still produce some undesired frequency modulation as well. It has also been proposed to feed the output from an unmodulated oscillator through a resistive attenuator with one or more of the elements therein constituted by a crystal or other non-linear device whose resistance is varied by a modulating voltage so that modulated attenuation and therefore amplitude modulation is produced. This type of arrangement, however, inevitably introduces a considerable loss of strength while, moreover, it has the defect that a low frequency component of the modulated signal appears in the modulated high (radio) frequency output and this component may even exceed the required radio frequency in amplitude, particularly at low radio frequency output levels. The unwanted low frequency component can of course be reduced by the use of suitable chokes, but in general it is not practicable to eliminate it entirely in this way or even to reduce it to acceptable proportions.

The object of the present invention is to avoid the defects of the known arrangements above referred to.

According to this invention an amplitude modulator arrangement for high frequency energy comprises a length of wave guide; means for launching a high frequency wave into said guide length; a pick-up head within said guide length; a pick-up coil within said guide length and carried by said pick-up head; a second coil coupled to the pick-up coil and in series with a non-linear device and a high frequency passing capacity, said second coil being also carried by said pick-up head; means for applying modulating potential in the circuit including said second coil and device; and means for taking off amplitude modulated high frequency from the circuit of the pick-up coil.

In the simplest and preferred embodiment of the invention the pick-up coil is included in a series circuit between the pick-up head and an output feeder and the second coil is included in a second series circuit which also includes the non-linear device and the capacity, the junction point of said device and said capacity being connected to the pick-up head and the modulating potentials being applied across the series connected device and second coil.

Preferably the pick-up head is a metallic sliding conductor in internal contact with the walls of the wave guide length and longitudinally slidable with respect thereto.

An arrangement in accordance with this invention is essentially a modulatable waveguide-beyond-cut-off attenuator (the guide diameter is, of course, arranged to be beyond cut-off) the modulated attenuation being obtained by virtue of the modulated absorption produced in the pick-up coil circuit due to its coupled relationship with the second coil circuit in which the modulated absorption actually occurs.

Figure 2:
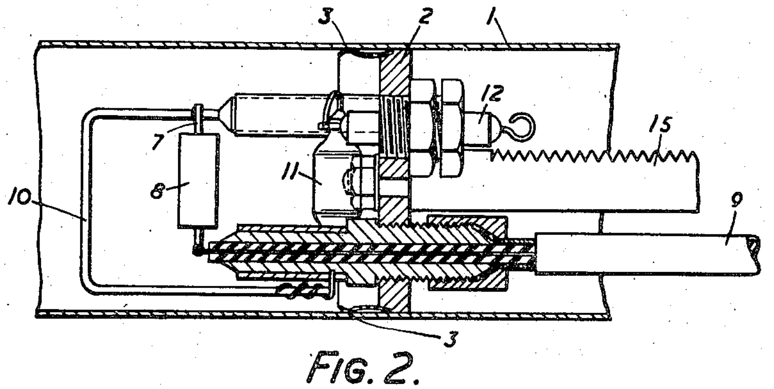
Figure 3:
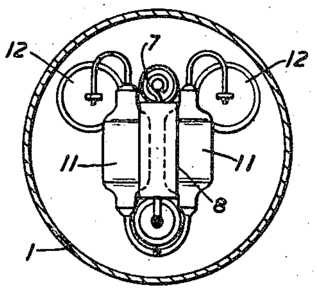

The invention is illustrated in the accompanying drawings in which Fig. 1 is a diagrammatic representation of a preferred embodiment and Figs. 2 and 3 are respectively longitudinal and transverse sectional views of an actual arrangement as represented by Fig. 1 showing the pick-up and coil circuits.

The arrangement shown in the drawings is a modulated waveguide-beyond-cut-off attenuator comprising a length of wave guide 1 within which is a slidable metallic pick-up head 2 having spring fingers 3 in contact with the inner walls of the guide. The wave guide operates as a waveguide-beyond-cut-off. An unmodulated valve oscillator 4 of any suitable form known per se feeds its oscillations to an oscillatory circuit comprising a coil 5 and a parallel adjustable capacity 6. The coil 5, which, in practice, may be a simple loop or a coil of any convenient number of turns, is arranged in one end of the guide to act as a launching coil designed to propagate the required wave guide mode in the guide. Connected at one end to the pick-up head 2 is a pick-up coil 7 the other end of which is connected through a suitable resistance 8 to the inner conductor of an output coaxial cable 9 which the output amplitude modulated energy is to be taken off. The coil 7 is mounted on the pick-up head 2. Tightly coupled to the coil 7 by mutual inductance represented by the bracket M is a second coil 10 one end of which is connected to the pick-up head through one or more crystal or other suitable non-linear elements 11, and the other end of which is connected back to the pick-up head through a large capacity 12 which will pass the radio frequency. The coil 10 is also carried by the pick-up head. Modulating potential from a source 13 on which is superimposed a suitable bias from a source 14 is applied across the series connected elements 10 and 11.

In operation the bias from the source 14 and the modulating signal from the source 13 are adjusted in amplitude until, under the condition in which the latter signal opposes the bias, the non-linear element, or elements, present a high impedance so that very little power is absorbed from the circuit including the pick-up coil 7, but when the modulating signals aid the bias the crystal impedance falls sufficiently to produce substantial power absorption thus reducing the amplitude of the radio signal fed to the feeder 9.

Like references are used for like parts throughout the figures. On comparing Figs. 2 and 3 with the circuit representation of Fig. 1 it will be seen that the capacity 12 is actually constituted by two parallel connected condensers (both referenced 12 in Figs. 2 and 3) and that in fact there are two crystals 11 in parallel in place of the single crystal represented in Fig. 1. The coil 10 is actually a half turn coil constituted by the loop marked 10 in Fig. 2 and the coil 7 is similarly a half turn coil constituted by the inherent inductance of the loop of which the resistance 8 forms part. The reference 7 in Fig. 2 is applied to a number of points in this loop. Fig. 2 shows a rack 15 constituting a driving rack which is engaged by a suitable pinion (not shown) for sliding the pick-up head 2 along the guide. The parts 4, 5, 6, 13 and 14 of Fig. 1 are not shown in Figs. 2 and 3.

With suitable choice of circuit elements, applied bias and modulating signal amplitude, a depth of modulation of some 50–60% is readily attainable by an arrangement as shown in the drawings. Even with this modulation the distortion is quite small. Since normally, in the case of an amplitude modulation signal generator, a depth of modulation of the order of 30% is all that is required, very good practical results are obtainable for, in these conditions, the reduction in the effective carrier amplitude is only about 25%, i.e. the system increased the attenuator insertion loss by 2 db. In all cases in which the radio frequency signal voltage is less than about one quarter of the audio frequency modulating voltage, the percentage modulation is practically independent of the radio frequency signal level in the feeder 9. The spurious frequency modulation produced is very nearly zero for all except minimum attenuation settings of the attenuator and there is virtually no low frequency component modulation in the modulated output.

I claim:

1. An amplitude modulator arrangement for high frequency energy comprising a length of wave guide; means for launching a high frequency wave into said guide length; a pick-up head within said guide length; a pick-up coil within said guide length and carried by said pick-up head; a second coil coupled to the pick-up coil and in series with a non-linear device and a high frequency passing capacity, said second coil being also carried by said pick-up head; a modulating source; means for applying modulating potential from said source to said second coil and device; and means for taking off amplitude modulated high frequency from the circuit of the pick-up coil.

2. An amplitude modulator arrangement as set forth in claim 1 wherein the pick-up coil is included in a series circuit between the pick-up head and an output feeder and the second coil is included in a second series circuit which also includes the non-linear device and the capacity, the junction point of said device and said capacity being connected to the pick-up head and the modulating potentials being applied across the series connected device and second coil.

3. An amplitude modulator arrangement as set forth in claim 1 wherein the pick-up head is a metallic sliding conductor in internal contact with the walls of the wave guide length and longitudinally slidable with respect thereto.

References Cited in the file of this patent

UNITED STATES PATENTS

| | | |
|---|---|---|
| 2,043,448 | Schuchter | June 9, 1936 |
| 2,616,037 | Wheeler et al. | Oct. 28, 1952 |
| 2,724,799 | Overacker et al. | Nov. 22, 1955 |